United States Patent
Wiley et al.

(10) Patent No.: US 6,895,553 B2
(45) Date of Patent: May 17, 2005

(54) SYSTEM AND METHOD THAT FACILITATES OFF-SITE PRINTING

(75) Inventors: Steve R. Wiley, Boise, ID (US); Corey J. Norris, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 541 days.

(21) Appl. No.: 09/981,158

(22) Filed: Oct. 17, 2001

(65) Prior Publication Data

US 2003/0072029 A1 Apr. 17, 2003

(51) Int. Cl.[7] ................................................ G06F 17/00
(52) U.S. Cl. ................... 715/526; 715/527; 715/523
(58) Field of Search ................. 715/526, 527, 715/523; 345/866; 709/200, 230; 358/1.2

(56) References Cited

U.S. PATENT DOCUMENTS

| | | | | |
|---|---|---|---|---|
| 5,517,668 A | * | 5/1996 | Szwerinski et al. | 709/230 |
| 5,937,144 A | * | 8/1999 | Wilkins et al. | 358/1.2 |
| 6,154,208 A | * | 11/2000 | Otala | 345/866 |
| 6,687,732 B1 | * | 2/2004 | Bector et al. | 709/200 |

* cited by examiner

*Primary Examiner*—Sanjiv Shah (57) ABSTRACT

The present disclosure relates to a system and method that facilitates off-site printing. In one arrangement, the system and method pertain to receiving printable data with a printing controller, forwarding the printable data to a proxy driver, receiving processed data from the proxy driver, and forwarding the processed data as a print job to a printing device.

10 Claims, 6 Drawing Sheets

SYSTEM AND METHOD THAT FACILITATES OFF-SITE PRINTING

FIELD OF THE INVENTION

The present disclosure relates to a system and method that facilitates off-site printing. More particularly, the disclosure relates to a system and method with which a user that is prohibited from installing driver software in controlled space can install a driver to access, for example, an off-site printer.

BACKGROUND OF THE INVENTION

Various software normally must be installed on a computing device, e.g., personal computer (PC), in order to be able to use a printing device such as a printer. Such software typically comprises a device driver and various applications that are used to control or configure the printing device. Printer drivers are typically needed to translate and send jobs from an application (e.g., word processing application) operating on the computing device to the printing device.

In office environments, such software is normally installed in controlled space on the user's computing device by a person that controls what software is installed on the device. Such control is often exercised by administrative personnel to ensure that viruses and other undesirable software is not downloaded to company-owned computing devices. This precaution prevents such viruses and other software from being shared with other company-owned computing devices to avoid large-scale problems.

In addition to preventing the user of the computing device from downloading undesired software, the above-noted prohibition can present significant drawbacks to the user. For instance, if the computing device is a portable device such as a laptop or personal digital assistant (PDA), the user may be unable to install software that is needed for the user to access and use other devices when off-site, e.g., on a business trip. More specifically, the user may be unable to install one or more drivers and any related software that are needed to print on a foreign printing device. This is unfortunate given that many off-site locations now offer printing services that users may access assuming that the relevant software can be downloaded to their computing devices. For example, many hotels now provide network access to one or more printing devices that can be used if the user installs one or more drivers on the user's computing device.

From the foregoing, it can be appreciated that it would be desirable to have a system and method for off-site printing which permits users to download software needed to access and use foreign devices.

SUMMARY OF THE INVENTION

The present disclosure relates to a system and method for that facilitates off-site printing. In one arrangement, the method comprises the steps of receiving printable data with a printing controller, forwarding the printable data to a proxy driver, receiving processed data from the proxy driver, and forwarding the processed data as a print job to a printing device.

In one arrangement, the system comprises means for receiving printable data, means for forwarding the printable data to a proxy driver, means for receiving processed data from the proxy driver, and means for forwarding the processed data as a print job to a printing device.

Other systems, methods, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed is a system and method for that facilitates off-site printing. By "off-site," intended is any environment for which a user, and more particularly a user's computing device, is not presently configured to use.

Figure 1:
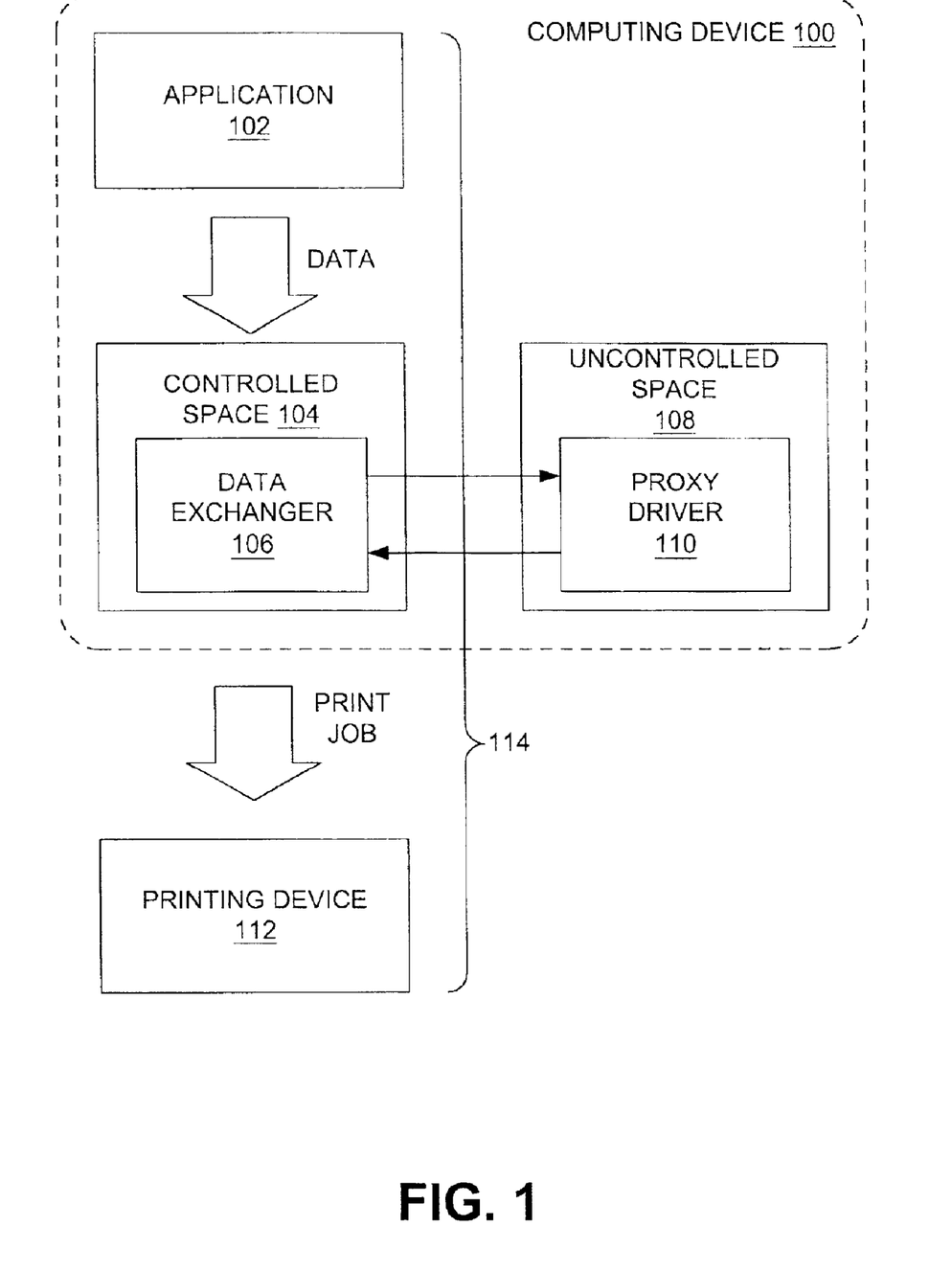
FIG. 1 is a schematic illustration of the inventive concept.

For instance, where the computing device is configured for use at the user's home or office, an "off-site" environment can comprise any other location that the computing device is not presently configured to utilize (e.g., to print). Despite the references to "off-site" printing, persons having ordinary skill in the art will appreciate that the invention described herein may have broader applications. FIG. 1 provides a schematic representation of the operation of the invention. As shown in FIG. 1, a computing device 100 can include an application 102 which can comprise any application that can generate, output, or identify printable data. By way of example, the application 102 can be a word processing application, spreadsheet application, presentation application, and so forth. As indicated in the figure, data can be output from the application 102 for delivery to a foreign printing device 112 along a print path 114. Before reaching the printing device, however, the data must be translated into a format (i.e., language) for which the printing device is configured. For instance, the data provided to the printing device 112 may need to be in printer control language (PCL) or PostScript language.

As is known in the art, the data translation is typically performed by a suitable driver that is provided in the print path. However, in that such software typically is stored in controlled space, i.e., space controlled by one or more designated administrative personnel, a driver typically cannot be installed by the user of the computing device if the device is owned and controlled by another entity, e.g., the user's employer. Because of this fact, the controlled space 104 of the computing device 100 comprises a data exchanger 106 that is configured to deliver the data output from the application 102 to a proxy driver 110 that the user has installed in the uncontrolled space 108 of the device, i.e., any space in the device memory where the user is free to download software. As is described in greater detail below, the proxy driver 110 comprises various software and/or firmware that is configured to translate data into the appropriate format and communicate the data back to the data exchanger 106 and print path 114.

With such an arrangement, the proxy driver 110 can receive the application data from the data exchanger 106, perform the necessary data translation, and return the data to the data exchanger so that the data exchanger can forward the translated data to the printing device 112 in the form of a print job that the printing device is configured to manipulate. Therefore, the printing device 112 can print the print job and the user can then obtain one or more hard copies of the data output from the application 102.

The general operation of the invention having been described above, an example of a system in which the invention can be implemented will be described. Although this system is described in detail, it will be appreciated that this system is provided for purposes of illustration only and that various modifications are feasible without departing from the inventive concept. After the example system has been described, examples of operation of the system will be provided to explain the manners in which off-site printing can be facilitated.

Figure 2:
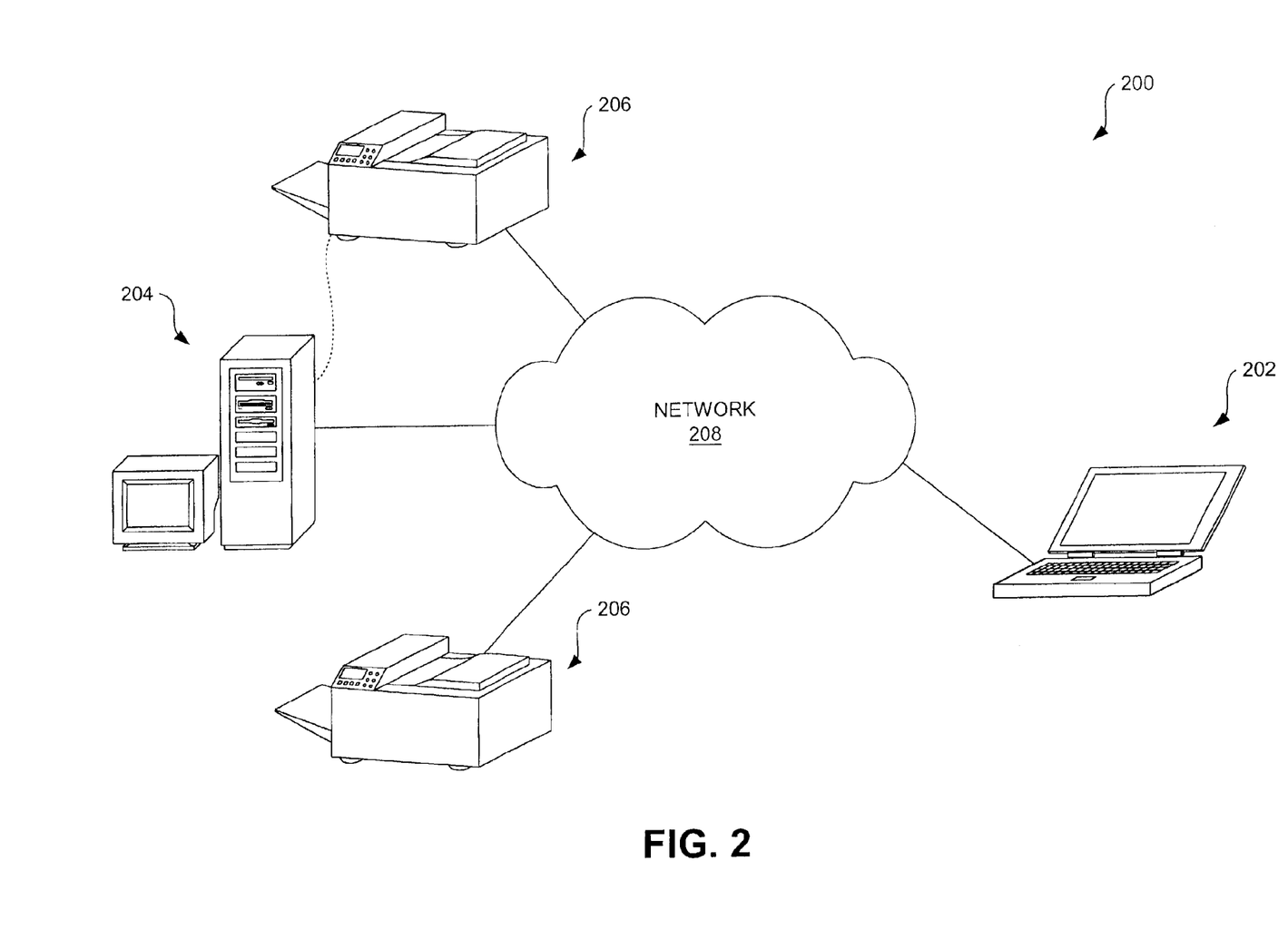
FIG. 2 is a schematic view of an example system in which the inventive system can be implemented.

Referring now to FIG. 2, illustrated is an example system 200. As indicated in this figure, the system 200 generally comprises a user computing device 202. By way of example, the computing device 202 is a portable computing device such as a laptop. Although a laptop is illustrated in FIG. 2 and explicitly described herein, it is to be understood that the computing device 202 can comprise other types of computing devices such as a desktop personal computer (PC) or a handheld computing device (e.g., personal digital assistant (PDA) or mobile telephone). Accordingly, the present invention is not limited to implementation with a laptop computer.

Also included in the system 200 is an off-site computing device 204 such as a network server 204. Although a network server is specifically described, it will be understood that the off-site computing device 204, like computing device 202, can comprise another type of computing device. By way of example, the computing device 204 is operated and maintained by an off-site entity such as a hotel. Further included in the system 200 is one or more printing devices 206. These printing devices 206 can comprise, for instance, one or more printers. Although printers are identified as a possibility, it will be appreciated that the printing devices 206 can comprise substantially any device capable of receiving printable data and generating hard copy documents based upon the printable data. Therefore, the printing devices 206 can be configured as one or more photocopiers, multifunction peripherals (MFPs), facsimile machines, etc. Typically, the printing devices 206 comprise devices that are operated and maintained by the same entity which operates and maintains the off-site computing device 204, e.g., a hotel.

As is further identified in FIG. 2, the user computing device 202, off-site computing device 204, and printing devices 206 can each be connected to a network 208. By way of example, the network 208 comprises a local area network (LAN) or wide area network (WAN) that includes one or more sub-networks. Indeed, in some embodiments, the network 208 may comprise a set of networks that forms part of the Internet. In addition, the off-site computing device 204 can be directly connected to one or more of the printing devices 206, if desired.

Figure 3:
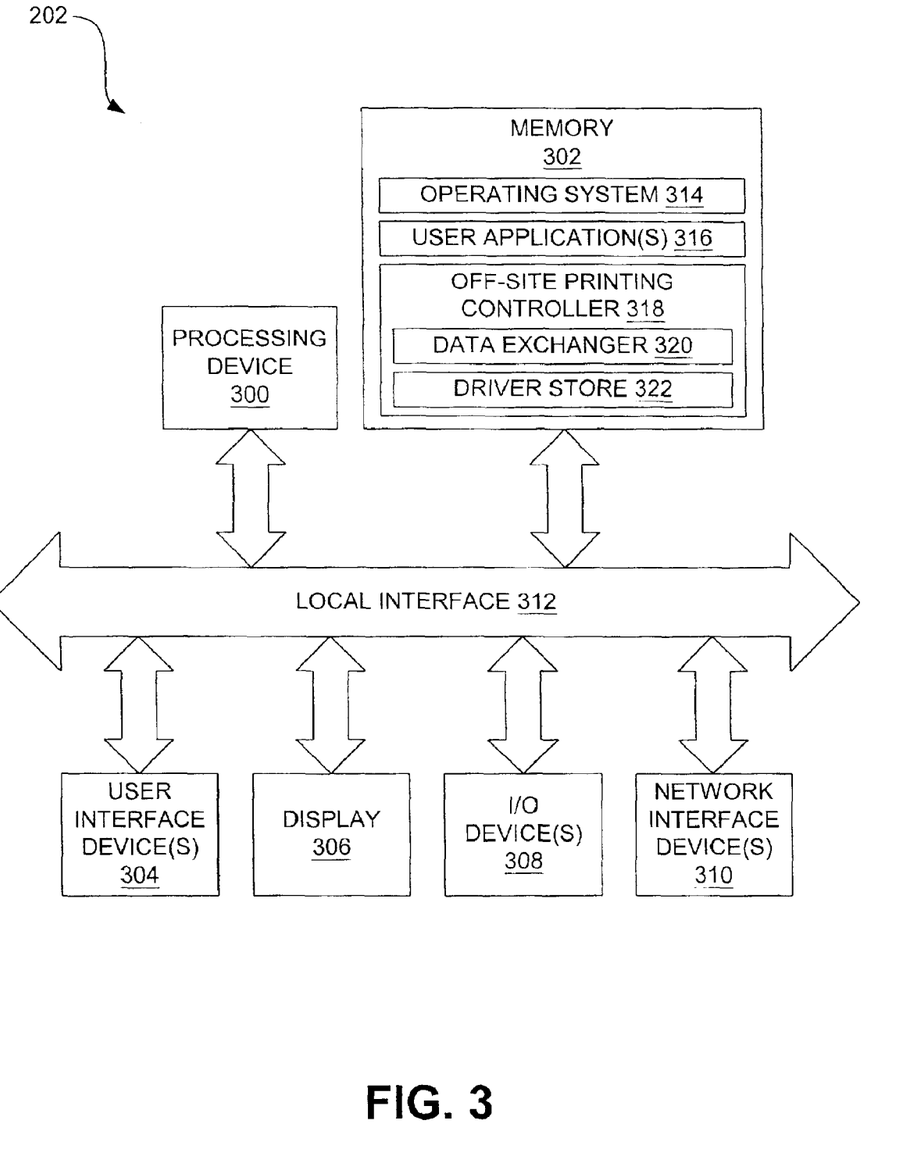
FIG. 3 is a schematic view of a user computing device shown in FIG. 2.

FIG. 3 is a schematic view illustrating an example architecture for the user computing device 202 shown in FIG. 2. As indicated in FIG. 3, the computing device 202 can comprise a processing device 300, memory 302, one or more user interface devices 304, a display 306, one or more I/O devices 308, and one or more networking devices 310, each of which is connected to a local interface 312. The processing device 300 can include any custom made or commercially available processor, a central processing unit (CPU) or an auxiliary processor among several processors associated with the computing device 202, a semiconductor based microprocessor (in the form of a microchip), or a macroprocessor. The memory 302 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 304 comprise those components with which the user can interact with the computing device 202. For example, where the computing device 202 comprises a PC or laptop, these components can comprise a keyboard and mouse. Where the computing device 202 comprises a handheld device (e.g., PDA, mobile telephone), these components can comprise function keys or buttons, a touch-sensitive screen, etc. The display 306 can comprise a computer monitor or plasma screen for a PC or laptop, or a liquid crystal display (LCD) for a handheld device.

With further reference to FIG. 3, the one or more I/O devices 308 are adapted to facilitate connection of the user computing device 202 to another device and may therefore include one or more serial, parallel, small computer system interface (SCSI), universal serial bus (USB), IEEE 1394 (e.g., Firewire™), and/or personal area network (PAN) components. The one or more network interface devices 310 comprise the various components used to transmit and/or receive data over the network 208. By way of example, the network interface devices 310 include a device that can communicate both inputs and outputs, for instance, a modulator/demodulator (e.g., modem), wireless (e.g., radio frequency (RF)) transceiver, a telephonic interface, a bridge, a router, network card, etc.

The memory 302 normally comprises an operating system 314, one or more user applications 316, and an off-site printing controller 318. The operating system 314 controls the execution of other software and provides scheduling, input-output control, file and data management, memory management, and communication control and related services. The one or more user applications 316 comprise various applications that generate, output, or identify printable data. By way of example, the applications 316 can comprise one or more of a word processing application (e.g., Word™), spreadsheet application (e.g., Excel™), and a presentation application (e.g., PowerPoint™).

The off-site printing controller 318 comprises various software and/or firmware that facilitates access and use of a foreign printing device, such as one operated and maintained by an off-site entity. As is identified in FIG. 3, the controller 318 can include a data exchanger 320 that is responsible for forwarding data to a proxy driver and to the foreign printing device, and a driver store 322 that is used to store one or more proxy drivers that are used to access and use the foreign printing device. Notably, the data exchanger 320 is located in controlled space while the driver store 322 is located in uncontrolled space such that the user does not need administrative privileges to store the proxy drivers in the store. Operation of the off-site printing controller 318 is described in detail with reference to FIGS. 5A and 5B.

Figure 4:
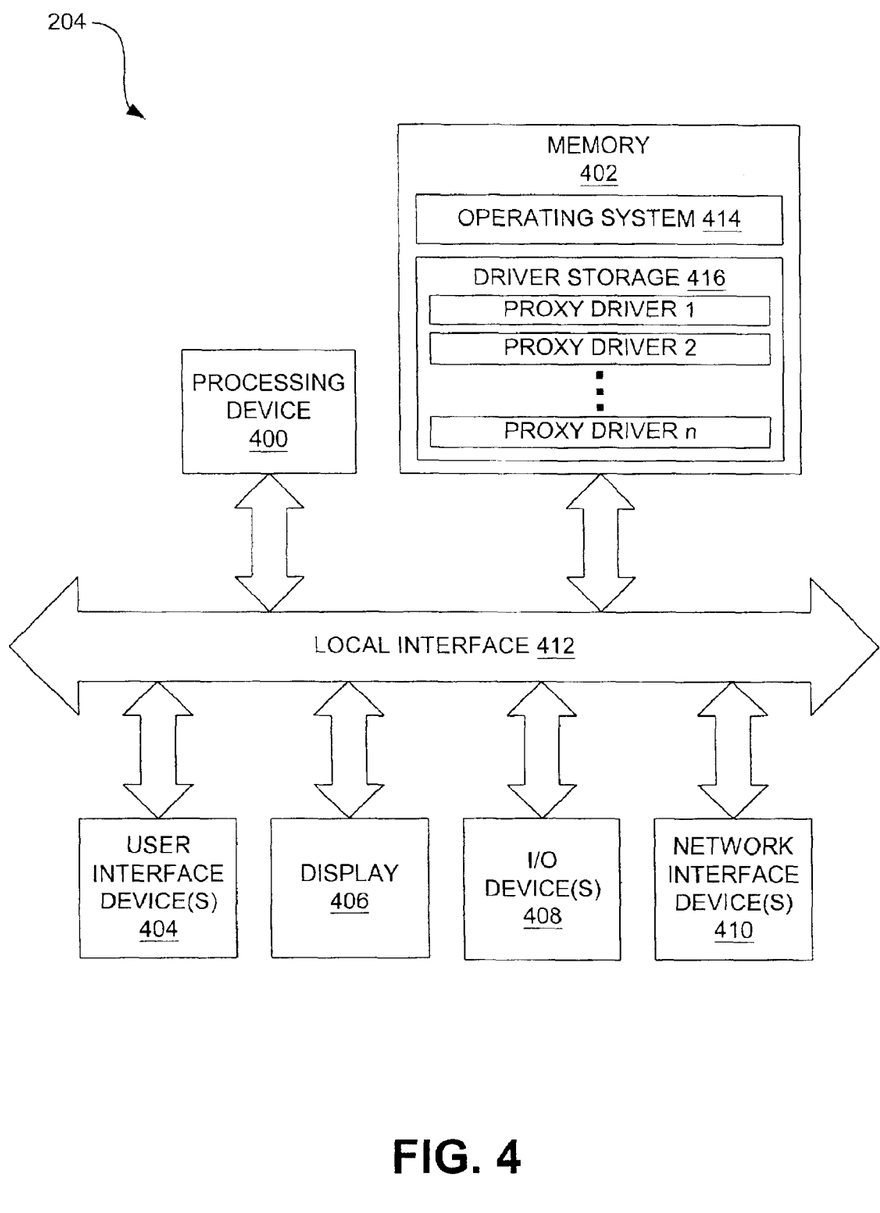
FIG. 4 is a schematic view of an off-site computing device shown in FIG. 2.

FIG. 4 is a schematic view illustrating an example architecture for the off-site computing device 204 shown in FIG. 2. As indicated in FIG. 4, the computing device 204 can be similar in terms of architecture to the user computing device 202. Accordingly, the off-site computing device 204 can comprise a processing device 400, memory 402, one or more user interface devices 404, a display 406, one or more I/O devices 408, and one or more networking devices 410, each of which is connected to a local interface 412. Like processing device 300, the processing device 400 can include any custom made or commercially available processor, a central processing unit (CPU) or an auxiliary processor among several processors associated with the computing device 204, a semiconductor based microprocessor (in the form of a microchip), or a macroprocessor. Similarly, the memory 402 can likewise include any one of a combination of volatile memory elements (e.g., random access memory (RAM, such as DRAM, SRAM, etc.)) and nonvolatile memory elements (e.g., ROM, hard drive, tape, CDROM, etc.). The user interface devices 404, display 406, I/O devices 408, and network interface devices 410 can also have similar configurations as those like-numbered components identified above with reference to FIG. 3.

The memory 402 normally comprises an operating system 414 and a driver store 416. As indicated in FIG. 4, the driver store 416 contains one or more proxy drivers (identified as proxy drivers 1 through n) which are configured to translate data from one or more user applications (e.g., user applications 316) into a language and/or format that the printing devices 206 use. More specifically, the proxy drivers are configured to, once installed on the user computing device 202, receive data from the data exchanger 320 of the off-site printing controller 318, translate the data, and return the data to the data exchanger such that the data be forwarded along the print path to a selected printing device 206. As will be apparent from the discussions that follow, these drivers are "proxy" drivers in that they act in substitute for the drivers normally used when printing in the usual environment (e.g., the user's home or office).

Various software and/or firmware programs have been described herein. It is to be understood that these programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, operation of the system will now be discussed. In the discussions that follow, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

As highlighted above, operation of the system generally involves use of software and/or firmware installed in the controlled space of a computing device to access a proxy driver installed in the uncontrolled space of the computing device. With such an arrangement, driver software necessary to access and use an off-site printing device can be downloaded to the user's computing device without the need for administrative privileges.

Before such an arrangement can be used, appropriate software, e.g., the off-site printing controller 318 identified in FIG. 3, must be installed on the user's computing device. In that this software is installed within the controlled space of the computing device, this installation typically is performed by an office administrator or other person having the required administrative privileges needed to install software to that space. Once this software has been installed, however, the user can then use the computing device to access and use off-site printing devices. To cite an example, if the user is on a business trip and wishes to use a printing device of the hotel at which he or she is staying, the user first downloads an appropriate proxy driver for that printing device. The user can obtain this proxy driver from, for instance, a read-only compact disk (CDROM) that is made available to the user (e.g., in the closet of the hotel room) or from an off-site computing device (e.g., computing device 204) via a network (e.g., network 208).

Again, in that no special privileges are needed to store software to the uncontrolled space, the user is free to install the needed driver software. In some arrangements, the off-site printing controller 318 can automatically retrieve the needed driver software from an appropriate storage location (e.g., driver storage 416) after, for instance, receipt of an off-site printing request entered by the user. In any case, the proxy driver or drivers are stored in a designated location of the uncontrolled space, e.g., the driver store 322. This store 322 can comprise a folder or other directory element that the off-site printing controller 318 searches by default when data is directed to it for the purpose of off-site printing. Arranged in this manner, the off-site printing controller 318 will not be required to search the entire user's hard disk when seeking the appropriate proxy driver.

Figure 5A:
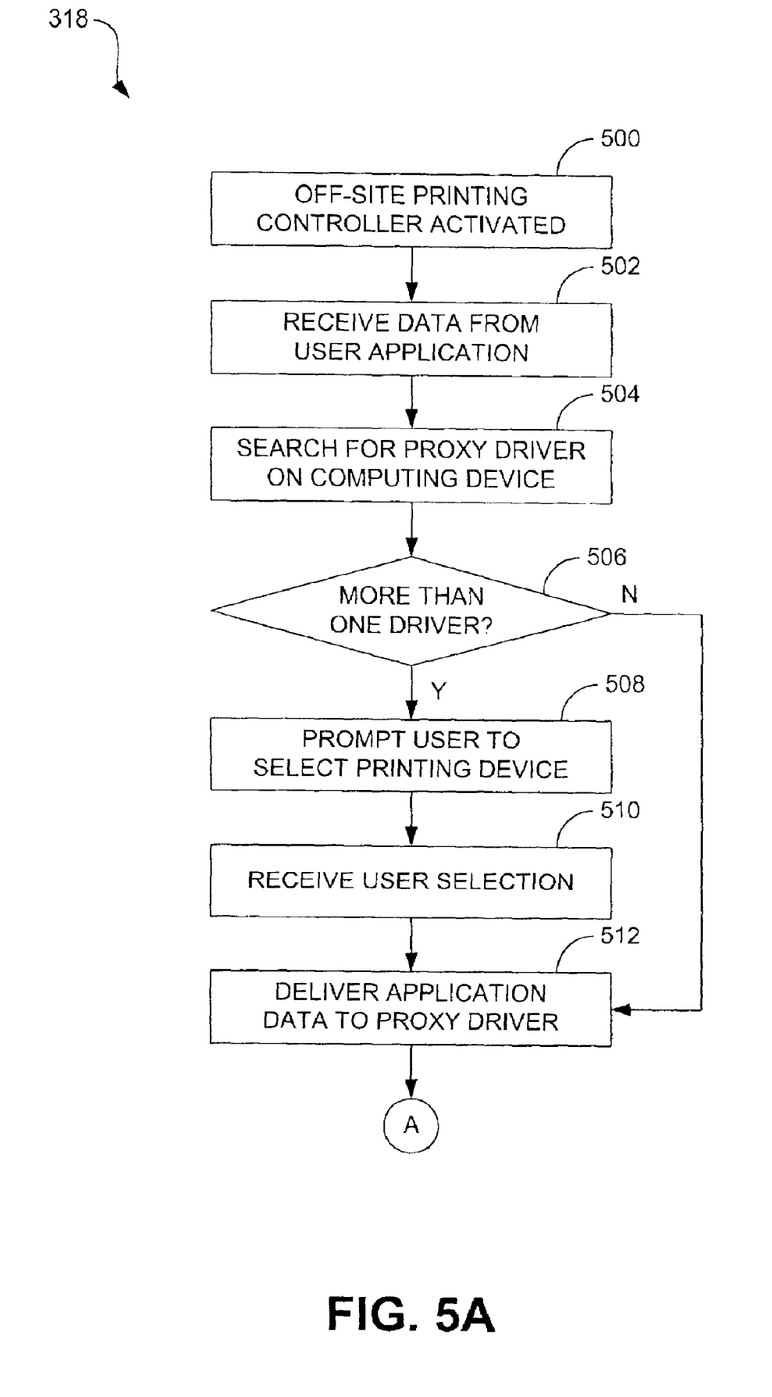
FIGS. 5A and 5B provide a flow diagram that illustrates operation of an off-site printing controller shown in FIG. 3.
Figure 5B:
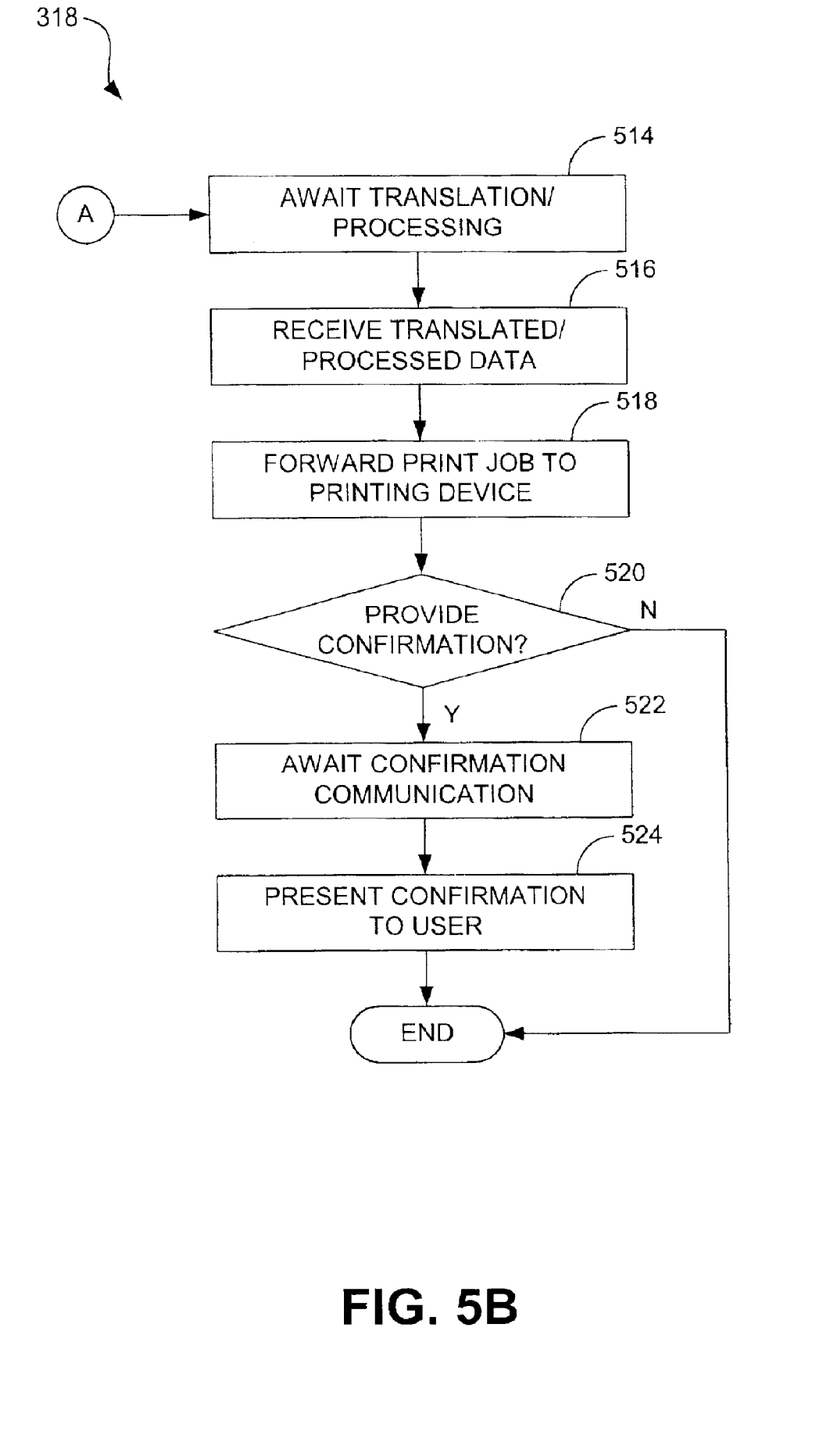

Use of the off-site printing controller 318 will now be discussed in relation to FIGS. 5A and 5B. In this discussion, it is assumed that the user has already downloaded an appropriate proxy driver to the driver store 322 as described above. Beginning with block 500 of FIG. 5, the off-site printing controller 318 is activated. This activation can take many different forms. Typically, however, activation of the printing controller 318 occurs when the user sends a print request to the controller. This print request can be submitted by the user through an application from which the user wishes to print (e.g., word processing application) or from a separate off-site printing application that is supported by the off-site printing controller 318 and which executed by the computing device 202. In any case, once the printing con troller 318 is activated, it can receive data from the user application, as indicated in block 502. These data may comprise text and/or graphics files. More generally, however, the data can be any printable data.

Once the data is received (or is begun to be received), the off-site printing controller 318 can search for an appropriate proxy driver, as indicated in block 504. Where one or more proxy drivers have been stored in the driver store 322 of the computing device 202 (either manually or automatically), the printing controller 318 can simply check this store to locate the proxy driver that will be used to facilitate printing of the application data. In such a case, the search for the proxy driver is greatly simplified in that the printing controller 318 need not search the entire hard disk of the computing device 202.

With reference to decision element 506, it can then be determined whether there is more than one proxy driver stored on the computing device. Multiple proxy drivers can be located where, for instance, the user downloaded one or more proxy drivers on a previous occasion or where the user has downloaded software for more than one printing device of the off-site location. If only one proxy driver is located, it can be used as the default proxy driver by the printing controller 318 and flow continues to block 512 described below. If, on the other hand, multiple proxy drivers are located, flow continues on to block 508 at which the printing controller 318 prompts the user to select which printing device (and thereby which driver) is to be used. The user can be prompted to select the printing device with, for instance, a pop-up dialogue box that lists each available printing device.

Once the user's selection has been entered, it is received, as indicated in block 510. At this point, the application data can be forwarded to the proxy driver by the off-site printing controller 318. More specifically, the data can be delivered to the proxy driver with the data exchanger 320 of the printing controller 318. Referring now to block 514 of FIG. 5B, the printing controller 318 can then await translation of the application data by the proxy driver. As noted above, this translation is typically necessary in that printing devices normally process data in a different format (i.e., language) than do most user applications. Although data "translation" is specifically identified, it will be appreciated that the proxy driver can be used to perform substantially any necessary processing on the data for the printing device.

Once the translation and/or other processing has been performed by the proxy driver, the translated/processed data is received by the off-site printing controller 318, as indicated in block 516. The off-site printing controller 318 can then forward these data as a print job to the printing device (e.g., printing device 206), as indicated in block 518. At this point, it can be determined whether the user wishes to receive confirmation that the print job has been successfully completed by the printing device, as indicated in decision element 520. If no such confirmation is desired, flow for the printing session is terminated. If, however, the user does wish to receive such confirmation, flow continues on to block 522 at which the printing controller 318 can await a confirmation communication from the printing device. By way of example, the user can communicate his or her desire for confirmation using the off-site printing application described above. Assuming that the print job was successfully completed by the printing device, a confirmation can then be presented to the user, as indicated in block 524, and flow for the printing session terminated.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for facilitating printing, comprising the steps of:

installing a proxy driver in a uncontrolled space of the computing device, the proxy driver being configured translate print data generated by a user application into a format that can be printed by a local printer for which no driver exists in a controlled space of the computer to which the user does has no access;

receiving print data from a user application with a printing controller stored in the controlled space of the computer device;

forwarding the printable data from the printing controller to the proxy driver;

translating the print data into a format that can be printed by the local printer using the proxy driver;

receiving translated data from the proxy driver with the printing controller; and forwarding the translated data as a print job from the printing controller to the local printing device.

2. The method of claim 1, further comprising the step of searching for the proxy driver prior to forwarding the print data to the proxy driver.

3. The method of claim 1, further comprising the step of prompting a user to select a local printing device to which to forward the print job.

4. A user printing system, comprising:

means for installing a proxy driver in an uncontrolled space of a computing device;

means, stored in a controlled space of the computing device to which the user does not have access, for receiving print data;

means for forwarding the print data to the proxy driver;

means for receiving translated data from the proxy driver; and means for forwarding the translated data as a print job to a local printing device.

5. The system of claim 4, further comprising means for searching for the proxy driver.

6. The system of claim 5, further comprising means for prompting a user to select a local printing device to which to forward the print job.

7. A computing device, comprising:

a processing device;

memory comprising a controlled space to which access is limited such that a user of the computing device cannot install software in the controlled space and an uncontrolled space in which the user can install software;

a proxy driver stored in the controlled space, the proxy driver being configured to translate print data into a print job for a local printing device; and an off-site printing controller stored in the controlled space of the memory, the printing controller being configured to receive print data selected by the user for printing from a user application, to forward the print data to the proxy driver stored in the controlled space, to receive translated data from the proxy driver, and to forward the translated data as a print job to the local printing device.

8. A computer-readable medium for use with a computing device, comprising:

logic configured to receive print data from a user application of the computing device, the data intended for printing by a local printing device for which no driver is stored within a controlled space of the computing device;

logic configured to forward the print data to a proxy driver that has been installed in an uncontrolled space of the computing device by the user, the proxy driver being configured to translate the print data into a print job for the local printer; and logic configured to receive translated data from the proxy driver and then forward the translated data as a print job to the local printing device.

9. The device of claim 8, further comprising logic configured to search for the proxy driver.

10. The device of claim 9, further comprising logic configured to prompt a user to select a local printing device to which to forward the printable data.

* * * * *